United States Patent [19]
Ackroyd et al.

[11] Patent Number: 5,566,704
[45] Date of Patent: Oct. 22, 1996

[54] BACKFLOW PREVENTER AND TEST COCK ASSEMBLY

[75] Inventors: Rand H. Ackroyd, Methuen; Steven P. Hofmann, Bradford, both of Mass.

[73] Assignee: Watts Investment Company, Wilmington, Del.

[21] Appl. No.: 369,412

[22] Filed: Jan. 6, 1995

[51] Int. Cl.$^6$ .............. E03C 1/10; F16K 37/00
[52] U.S. Cl. .............. 137/14; 137/218; 137/557; 137/614.2
[58] Field of Search .............. 137/14, 218, 557, 137/614.2; 251/149.4, 149.6; 73/756

[56] References Cited

U.S. PATENT DOCUMENTS

| | | |
|---|---|---|
| 2,320,456 | 6/1943 | Frazer-Nash ............... 251/149.6 |
| 3,173,439 | 3/1965 | Griswold et al. . |
| 3,276,465 | 10/1966 | Wyckoff . |
| 3,483,884 | 8/1967 | Sullivan . |
| 3,670,760 | 6/1972 | Butcher et al. . |
| 3,724,487 | 4/1973 | Hunter . |
| 3,818,929 | 6/1974 | Braukmann ............... 137/218 |
| 3,825,222 | 7/1974 | Petrova ............... 251/149.6 |
| 3,837,358 | 9/1974 | Zieg et al. . |
| 3,918,477 | 11/1975 | Grams . |
| 4,044,787 | 8/1977 | Sutherland . |
| 4,064,896 | 12/1977 | Trenary . |
| 4,244,392 | 1/1981 | Griswold et al. . |
| 4,253,488 | 3/1981 | Leverberg ............... 251/149.6 X |
| 4,284,097 | 8/1981 | Becker et al. . |
| 4,338,793 | 7/1982 | O'Hern ............... 251/149.6 X |
| 4,364,408 | 12/1982 | Griswold et al. . |
| 4,489,746 | 12/1984 | Daghe et al. . |
| 4,506,694 | 3/1985 | Daghe et al. . |
| 4,527,587 | 7/1985 | Fairlamb ............... 137/614.2 X |
| 4,658,852 | 4/1987 | Weingarten . |
| 4,672,991 | 6/1987 | Badders . |
| 4,878,515 | 11/1989 | Stevens . |
| 4,945,940 | 8/1990 | Stevens . |

*Primary Examiner*—Gerald A. Michalsky
*Attorney, Agent, or Firm*—Fish & Richardson P.C.

[57] ABSTRACT

A backflow prevention test assembly for a backflow preventer has a test valve in fluid communication with a conduit of the backflow preventer and a test kit. The test valve has a body defining an axial bore, and a piston defining a test conduit is disposed within the axial bore for movement between a first position permitting test flow through the test conduit and a second position resisting test flow. The piston is biased toward the second position. The test kit includes a test apparatus and a fitting for attachment upon the test valve body in sealing engagement. The fitting defines a displacement surface for engagement, after sealing engagement of the seal with the test valve, with an opposed surface of the piston to urge the piston toward its first position, thereby to establish fluid communication between the test apparatus and a region of the backflow preventer conduit. A method of testing fluid within the flow conduit of the backflow preventer is also described.

7 Claims, 3 Drawing Sheets

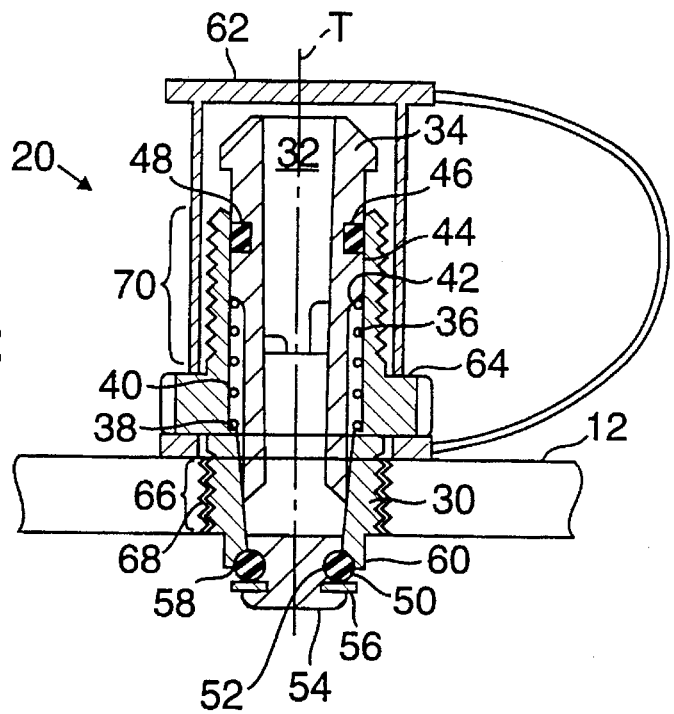
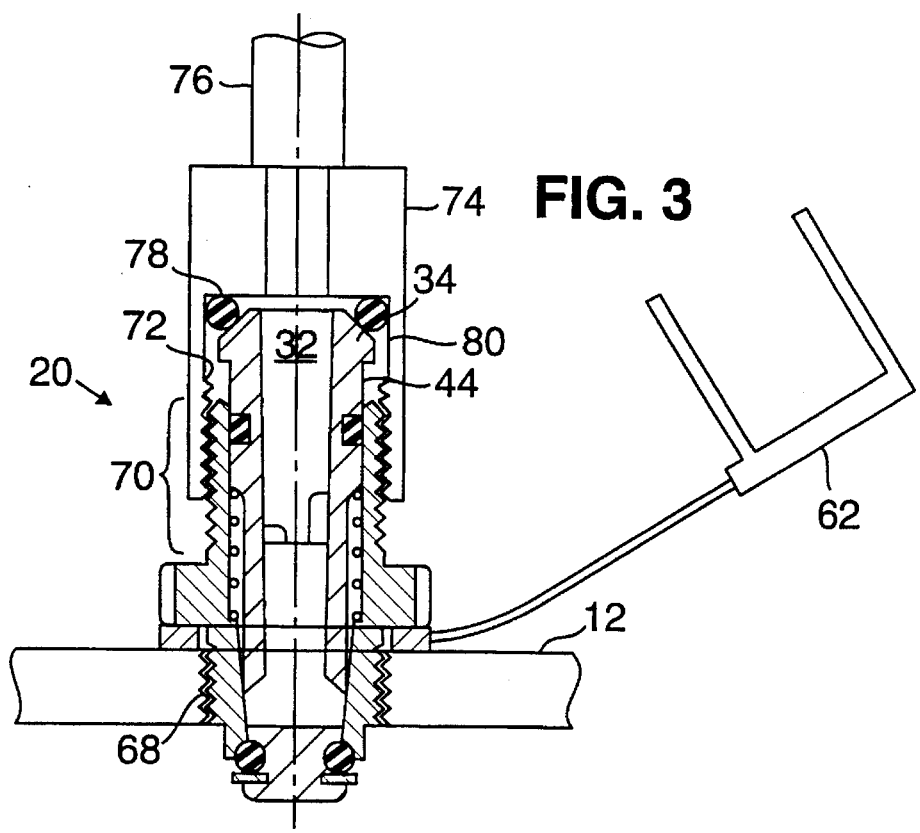

BACKFLOW PREVENTER AND TEST COCK ASSEMBLY

BACKGROUND OF THE INVENTION

This invention relates to backflow preventers.

Backflow preventers, examples of which can be found in U.S. Pat. Nos. 4,878,515, 4,044,787 and 3,918,477, are principally used for preventing contamination of a public water distribution system by preventing backflow or backsiphonage of contaminated water into the system. Usually, the backflow preventer assembly is installed in a pipeline between a main supply line and a service line that feeds an installation, e.g. hotels, factories or other institutions, or even a multi or single family residence.

A backflow prevention assembly may typically include one or several test cocks, e.g. standard ball valves, to allow service personnel to test the performance of a backflow preventer, e.g. during maintenance or repair.

SUMMARY OF THE INVENTION

According to the invention, a backflow prevention test assembly for use with a backflow preventer comprises at least one test valve in fluid communication with the conduit through an aperture defined by the backflow preventer body, the test valve comprising a test valve body defining an axial bore, a piston defining a test conduit and disposed within the axial bore for movement between a first position permitting test flow through the test conduit and a second position resisting test flow through the test conduit, and means for biasing the piston toward the second position, and a test kit assembly comprising a test apparatus, and a fitting sized for attachment upon the test valve body in sealing engagement, the fitting comprising a fitting seal positioned for sealing engagement with the test valve, and the fitting defining a displacement surface disposed for engagement, after sealing engagement of the fitting seal with the test valve, with an opposed surface of the piston in a manner to urge the piston toward the first position, thereby to establish fluid communication between the test apparatus and a region of the conduit within the backflow preventer body.

Preferred embodiments of the invention may include one or more of the following additional features. The means for biasing comprises a spring mounted within the test valve body to act against the piston, the spring compressed by movement of the piston toward the first position. The test cock further comprises an o-ring seal positioned for sealing engagement between the piston and an interior wall of the test valve body. The test valve body defines a first threaded section for integrating the test cock into the backflow prevention assembly. Preferably, the test valve body defines a second threaded section for attachment of a test device thereupon. The test cock further comprises a protective cap for attachment upon the test valve body to protect the piston against movement toward the first position.

According to another aspect of the invention, a method for selectively allowing access to a fluid within a body of a backflow prevention apparatus comprises the steps of: providing a test cock integrated into the body of the apparatus, the test cock comprising a test valve body defining an axial bore, a piston defining a test conduit and disposed within the axial bore for movement between a first position permitting test flow through the test conduit and a second position resisting test flow through the test conduit, means for biasing the piston toward the second position, and a protective cap for attachment upon the test valve body to protect the piston against movement toward the first position; removing the protective cap from the test valve body element to expose the piston; attaching a test device to the test valve body in a manner whereby the test device first achieves a seal with the test valve and thereafter displaces the piston toward the first position to permit flow of fluid from within the body of the backflow preventer, through the axial bore of the piston to the test device; after testing, disconnecting the test device from the test valve body in a manner whereby a seal is first obtained to resist flow of fluid from within the body of the backflow preventer into the test conduit, and thereafter the test device is disengaged from the test valve body; and reattaching the protective cap.

The invention thus provides a backflow prevention testing assembly incorporating one or several test cocks that are opened for test flow only upon sealed attachment of the test equipment.

Other features, objects and advantages of the invention will become apparent from the following detailed description of a presently preferred embodiment, and from the claims.

BRIEF DESCRIPTION OF THE DRAWING

FIG. 2 is a side sectional view of a test cock of the invention with a protective cap in place;

FIG. 3 is a similar view of the test cock of FIG. 2, with the protective cover removed, and the test equipment positioned for actuation (opening) of the test cock.

DESCRIPTION OF A PRESENTLY PREFERRED EMBODIMENT

Figure 1:
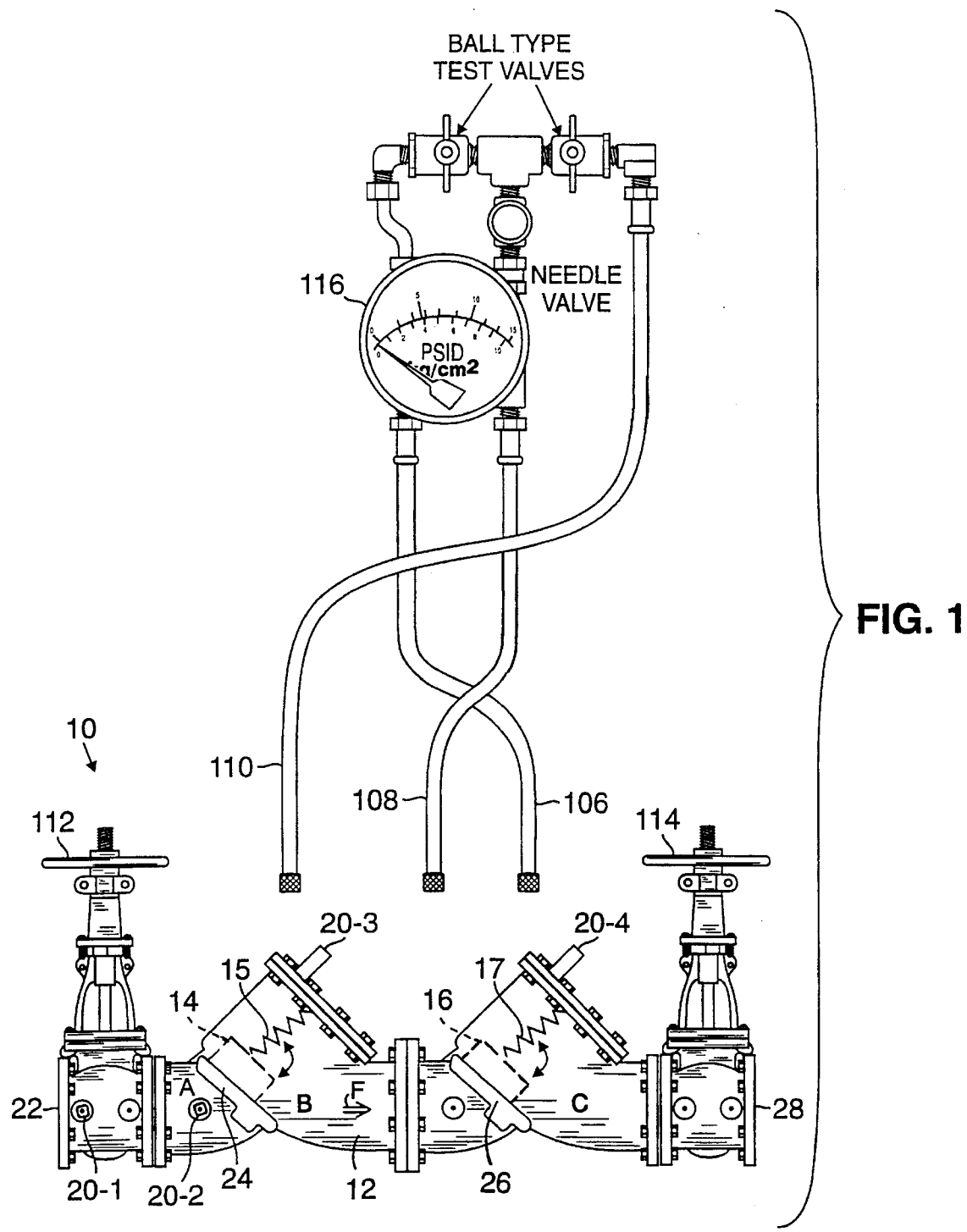
FIG. 1 is a front view, partially in section, of a backflow prevention assembly equipped with test cocks of the invention, attached to test equipment.

Referring to FIG. 1, a typical backflow prevention assembly 10 consists of a body 12 defining a conduit for flow of water therethrough. A pair of gate valves 14, 16 (shown in dashed line) are mounted within the body in positions to allow flow of water through the conduit in a first direction, indicated by arrow, F, but to prevent backflow of water in the opposite direction. Typically, the gate valves 14, 16 are biased to a closed position, e.g. by springs 15, 17, respectively, to require fluid pressure in the direction, F, to exceed a predetermined threshold before the gates valves are opened.

Potable water from the public water distribution system enters the backflow prevention assembly 10 at the inlet end 22. Assuming that the supply pressure exceeds the predetermined threshold value, established by springs 15, 17, biasing the gate valves 14, 16 toward closed positions, the gate valves are displaced from sealing engagement with the respective seats 24, 26 to allow water flow through the conduit of the valve body 12, to the outlet end 28.

Test cocks 20-1, 20-2, 20-3 and 20-4 of the invention are mounted at threaded apertures 68 (FIG. 2) defined in body 12 to allow monitoring of fluid pressure and flow in the regions A (upstream of the first gate valve), B (between the gate valves), and C (downstream of the second gate valve).

Figure 4:
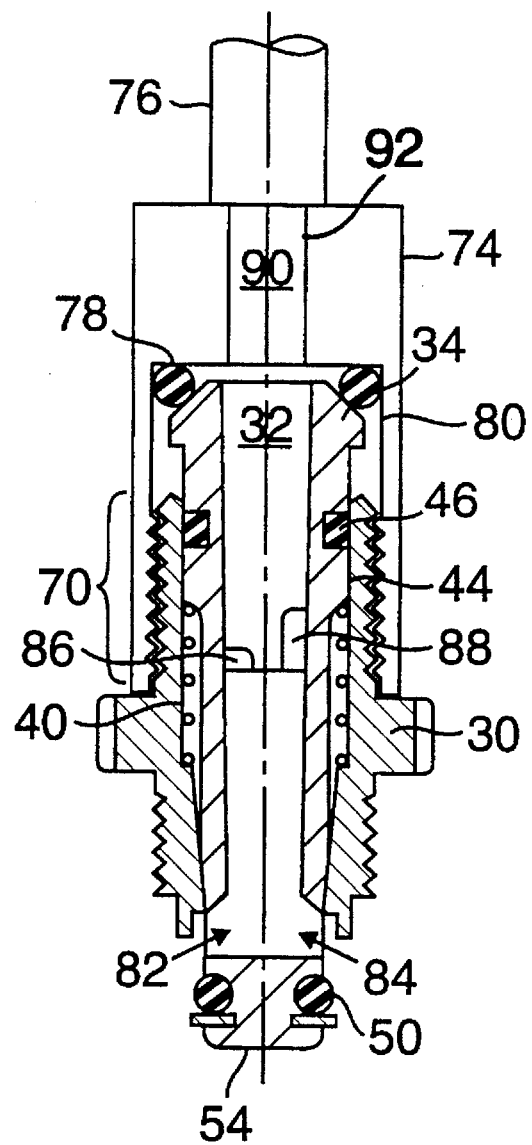
FIG. 4 is another similar view of the test cock of FIG. 2 with the test equipment secured to actuate (open) the test cock for test flow.

Referring to FIG. 2, a test cock 20 of the invention, shown in closed position, consists of a body 30 defining a passageway 32 aligned with an axis, T. A piston 34 is disposed within the passageway for movement along axis T between a first (closed) position and a second (open) position (FIG. 4). A spring 36, disposed about the piston 34, is engaged in compression between an annular shoulder 38 defined by the inner surface 40 of the body and an opposed annular shoulder 42 defined by the outer surface 44 of the piston to bias the piston toward the first (closed) position. A first o-ring 46 is disposed in a groove 48 defined in the outer surface 44 of the piston to provide a seal between the opposed surfaces 40, 44 of the body and piston. A second o-ring 50 is disposed in a groove 52 defined in the outer surface 44 in the region of the inner end 54 of the piston 34, supported by a slotted lock ring 56. O-ring 50 is positioned for sealing engagement with a seat surface 58 defined by the inner end 60 of the body when the test cock is closed. The test cock 20 also includes a cap 62.

The outer surface 64 of test cock body 12 is threaded in a first region 66 for engagement in a threaded aperture 68 defined by the backflow preventer assembly body 12. With test cock 20 secured in place in the bore of backflow preventer assembly 10, O-rings 46, 50 form a seal to prevent fluid from the interior of the assembly from escaping through test cock 20. The outer surface 64 of test cock body 12 is also threaded in a second region 70 for engagement by the threads 72 of an SAE fitting 74 on the test equipment hose 76 (FIG. 3), as we will now describe.

Referring to FIG. 3, with cap 62 removed, SAE fitting 74 of test equipment hose 76 is partially threaded onto threaded region 70. An o-ring 78 provides a seal between an inner surface 80 of fitting 74 and outer surface 44 of piston 34 before test cock 20 opens for flow testing to prevent leakage of fluid between surfaces 80, 44.

Referring to FIG. 4, with fitting 74 fully threaded onto threaded region 70, piston 34 is forced down into the interior of backflow prevention assembly 10, compressing spring 36 opening test cock 20 for flow testing. With test cock 20 in its open position, end 54 of piston 34 defines flow paths, arrows 82, 84, leading to openings 86, 88 respectively which provide a fluid path to passageway 32 located in the interior of piston 34. The fluid travels through passageway 32, through an aperture 90 defined by an inner surface 92 of fitting 74 and into test equipment hose 76. Note that o-ring 50 is not providing any sealing function when test cock 20 is in its open position. However, o-ring 46 provides sealing between the opposed surfaces 40 and 44 of body 30 and piston 34, and o-ring 78 provides sealing between the opposed surfaces 44 and 80 of piston 34 and fitting 74 preventing fluid from escaping around the outside of piston 34.

Referring again to FIG. 1, with test cocks 20-2, 20-3 and 20-4 in fluid communication with the regions A, B and C within the backflow preventer respectively, the test procedure for determining the performance of the backflow preventer is as follows:

To Test Check Valve 14

Step 1: Flush the test cocks.

Step 2: Fully connect high hose 106 to test cock 20-2 opening test cock 20-2 to purge air from high hose 106 and differential pressure gauge 116.

Step 3: Partially unthread high hose 106 from test cock 20-2 to close test cock 20-2.

Step 4: Close shutoff valve 114.

Step 5: Close shutoff valve 112.

Step 6: Fully connect low hose 108 to test cock 20-3 to open test cock 20-3.

Step 7: Rethread high hose 106 to test cock 20-2 to open test cock 20-2.

Step 8: Observe the indicator on differential pressure gauge 116; the differential pressure must be maintained at or above 1.0 p.s.i.d. (6.9 kPa.)

To Test Check Valve No. 16

Step 1: Flush the test cocks.

Step 2: Fully connect high hose 106 to test cock 20-3 opening test cock 20-3 to purge air from high hose 106 and differential pressure gauge 116.

Step 3: Partially unthread high hose 106 from test cock 20-3 to close test cock 20-3.

Step 4: Close shutoff valve 112.

Step 5: Fully connect low hose 108 to test cock 20-4 to open test cock 20-4.

Step 6: Rethread high hose 106 to test cock 20-3 to open test cock 20-3.

Step 7: Observe the indicator on differential pressure gauge 116; the differential pressure must be maintained at or above 1.0 p.s.i.d. (6.9 kPa.)

Test for Leaky Shutoff Valve 114

Step 1: Connect the high hose 106 to test cock 20-1, low hose 108 to test cock 20-4, opening test cocks 20-1 and 20-4. Close shutoff valves 112, 114.

Step 2: If the differential gauge rises above 0, there is excessive leakage at shutoff valve 114 and it must be replaced to test the assembly.

After testing, unthreading SAE fitting 74 and removing it from test cock 20 allows spring 36 to expand and force piston 34 to it's original, closed position as shown in FIG. 3. With test cock 20 in its closed position, o-ring 50 prevents fluid from the interior of assembly 10 from entering openings 39, 40.

To assemble test cock 20, o-ring 46 is placed in groove 48. Spring 36 is fed over end 54 of piston 34 and up against annular shoulder 42. This assembly is then fed into body 30 through passageway 32 until spring 36 is up against annular shoulder 38. Pushing piston 34 through body 30 as far as possible compresses spring 36 and exposes groove 52. O-ring 50 is then stretched over piston 34 and into groove 52 with lock-ring 56 positioned next to O-ring 50. Cap 62 is the placed over body 30.

Other embodiments are within the following claims.

What is claimed is:

1. A backflow prevention test assembly for use with a backflow preventer comprising a body defining a conduit for flow of fluid between an inlet and an outlet, a first valve and a second valve disposed in sequence in the conduit, the first valve having a first position permitting flow in a first direction and a second position opposing flow in a second direction opposite the first direction, with first means for biasing the first valve toward the second position, and the second valve having a first position permitting flow in the first direction and a second position for opposing flow in the second direction, with second means for biasing the second valve toward the second position, said backflow prevention test assembly comprising:
at least one test valve in fluid communication with the conduit through an aperture defined by the backflow preventer body, said test valve comprising
a test valve body defining an axial bore, said test valve body having a male end and an outer surface having a male thread,
a piston defining a test conduit and disposed within said axial bore for movement between a first position permitting test flow through said test conduit and a second position resisting test flow through said test conduit, and means for biasing said piston toward said second position, and a test kit assembly comprising a test apparatus, and a fitting sized for threaded attachment upon said male end of said test valve body in sealing engagement, said fitting comprising a fitting seal positioned for sealing engagement with said test valve, and said fitting defining a displacement surface disposed for engagement, after sealing engagement of said fitting seal with said test valve, with an opposed surface of said piston in a manner to urge said piston toward said first position, thereby to establish fluid communication between said test apparatus and a region of the conduit within the backflow preventer body.

2. The apparatus of claim 1 wherein said means for biasing comprises a spring mounted within said test valve body to act against said piston, said spring compressed by movement of said piston toward said first position.

3. The apparatus of claim 1 wherein said test valve further comprises an o-ring seal positioned for sealing engagement between said piston and an interior wall of said test valve body.

4. The apparatus of claim 1 wherein said test valve body defines a second threaded section for integrating said test valve into said backflow prevention assembly.

5. The apparatus of claim 1 wherein said test valve further comprises a protective cap for attachment upon said test valve body to protect said piston against movement toward said first position.

6. A method for selectively allowing access to a fluid within a body of a backflow prevention apparatus, said method comprising the steps of:

providing a test cock integrated into the body of the apparatus, the test cock comprising a test valve body defining an axial bore, said test valve body having a male end and an outer surface having a male thread, a piston defining a test conduit and disposed within the axial bore for movement between a first position permitting test flow through the test conduit and a second position resisting test flow through the test conduit, means for biasing the piston toward the second position, and a protective cap for attachment upon the test valve body to protect the piston against movement toward the first position, removing the protective cap from the test valve body element to expose the piston, threadedly attaching a test device to the male end of the test valve body, said test device including a fitting seal such that attachment of the test device to the test valve body first achieves a seal with the test valve and thereafter displaces the piston toward the first position to permit flow of fluid from within the body of the backflow preventer, through the axial bore of the piston to the test device, after testing, disconnecting the test device from the test valve body in a manner whereby a seal is first obtained to resist flow of fluid from within the body of the backflow preventer into the test conduit, and thereafter the test device is disengaged from the test valve body, and reattaching the protective cap.

7. A backflow prevention test assembly for use with a backflow preventer comprising a body defining a conduit for flow of fluid between an inlet and an outlet, a first valve and a second valve disposed in sequence in the conduit, the first valve having a first position permitting flow in a first direction and a second position opposing flow in a second direction opposite the first direction, with first means for biasing the first valve toward the second position, and the second valve having a first position permitting flow in the first direction and a second position for opposing flow in the second direction, with second means for biasing the second valve toward the second position, said backflow prevention test assembly comprising:

at least one test valve in fluid communication with the conduit through an aperture defined by the backflow preventer body, said test valve comprising a test valve body defining an axial bore, said test valve body having a male end and an outer surface having a male thread, a piston defining a test conduit and disposed within said axial bore for movement between a first position permitting test flow through said test conduit and a second position resisting test flow through said test conduit, means for biasing said piston toward said second position, and an inner seal positioned for sealing engagement between said piston and an interior wall of said test valve body, said inner seal preventing fluid communication between said conduit and said test valve with said piston in said second position, and a test kit assembly comprising a test apparatus, and a fitting sized for threaded attachment upon said male end of said test valve body in sealing engagement, said fitting comprising a fitting seal positioned for sealing engagement with said test valve, and said fitting defining a displacement surface disposed for engagement, after sealing engagement of said fitting seal with said test valve, with an opposed surface of said piston in a manner to urge said piston toward said first position, thereby to establish fluid communication between said test apparatus and a region of the conduit within the backflow preventer body.

* * * * *